(12) United States Patent
Williamson et al.

US007729971B2

(10) Patent No.: US 7,729,971 B2
(45) Date of Patent: Jun. 1, 2010

(54) COMPUTER-AIDED FINANCIAL SECURITY ANALYSIS SYSTEM AND METHOD

(75) Inventors: John Charles Williamson, Summit, NJ (US); Kathryn Ryan Booth, Harrison, NY (US); Francois Rene Trahan, Brooklyn, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 628 days.

(21) Appl. No.: 11/430,521

(22) Filed: May 8, 2006

(65) Prior Publication Data

US 2007/0016502 A1    Jan. 18, 2007

Related U.S. Application Data

(60) Provisional application No. 60/679,434, filed on May 9, 2005.

(51) Int. Cl.
G06Q 40/00 (2006.01)
(52) U.S. Cl. .................... 705/36 R; 705/37; 705/35; 379/88.1; 725/9; 709/245
(58) Field of Classification Search ............. 705/35–37; 379/88.1; 725/9
See application file for complete search history.

(56) References Cited

U.S. PATENT DOCUMENTS

| 5,761,442 | A | * | 6/1998 | Barr et al. ................. 705/36 R |
| 6,112,203 | A | * | 8/2000 | Bharat et al. ................... 707/5 |
| 7,529,703 | B2 | * | 5/2009 | Benzschawel et al. ..... 705/36 R |
| 2002/0032629 | A1 | * | 3/2002 | Siegel et al. .................. 705/36 |
| 2002/0184126 | A1 | * | 12/2002 | McIntyre et al. .............. 705/35 |
| 2003/0004846 | A1 | * | 1/2003 | Schneider .................... 705/36 |
| 2004/0215976 | A1 | * | 10/2004 | Jain ........................... 713/201 |
| 2004/0220771 | A1 | | 11/2004 | Breiman |
| 2005/0038729 | A1 | * | 2/2005 | Hsu et al. ..................... 705/37 |
| 2005/0090911 | A1 | | 4/2005 | Ingargiola et al. |
| 2006/0069633 | A1 | * | 3/2006 | Breslow et al. ............... 705/35 |
| 2006/0190378 | A1 | * | 8/2006 | Szydlo ......................... 705/35 |
| 2006/0218199 | A1 | * | 9/2006 | Kishi ......................... 707/200 |

OTHER PUBLICATIONS

Definition of "security" from Credo Reference, speciifcally The Penguin International Dictionary of Finance.*
Robert J. Shiller et al. "Stock Prices and Social Dynamics", Yale University; Brooking Papers o Economic Activity, vol. 1984. No. 2 (1984). pp. 457-510.*
Michael J. Brennan et al. "Investment Analysis and the Adjustment of Stock Prices to Common Information"; The Review of Financial Studies/ v 6 n 4 1993.*
Written Opinion and International Search Report for International Patent Application No. PCT/US06/17769 issued Aug. 29, 2007.

* cited by examiner

*Primary Examiner*—Harish T. Dass
(74) *Attorney, Agent, or Firm*—Lowenstein Sandler PC

(57) ABSTRACT

A computer-aided financial analysis system and method provides research analytical capabilities for modeling financial security holdings that include the capability to conduct multidimensional dynamic searches across fundamental research, technical research, market data and exposure to exogenous economic and market factors. The capability to isolate securities most susceptible to market movements and overlay available research analyses on top of this view and to view exposure to directional change in any exogenous economic and market factor on an individual security or portfolio of securities in a real-time, intuitive manner via charts, tables and/or heat maps is also provided.

33 Claims, 17 Drawing Sheets

| BSC Security Rating Doubleclick to view research | MARP Net Revision Rank | MARP Rel Value Rank | BSC EPS Estimate | | BSC Target Price | BSC Sector Rating | Indep. Rsch. Rating Doubleclick to view Rsch |
|---|---|---|---|---|---|---|---|
| | | | Current FY | Next FY | | | |
| Outperform | N/A | N/A | 2.50 | 2.93 | 60.00 | Market weight | Hold |
| Outperform | 6 | 7 | 1.91 | 2.20 | 52.00 | Market Overweight | Hold |
| Outperform | N/A | N/A | N/A | N/A | N/A | Market Overweight | Buy |
| Peer Perform | | | | | | Overweight | Hold |
| Outperform | | | | | | Weight | Hold |
| Peer Perform | | | | | | Weight | Hold |
| Peer Perform | | | | | | Weight | Hold |
| Peer Perform | | | | | | Weight | Sell |
| Peer Perform | | | | | | Overweight | Hold |
| Peer Perform | 3 | 9 | 2.39 | 2.64 | N/A | Weight | Buy |
| Peer Perform | N/A | N/A | 2.27 | 2.30 | N/A | Market Weight | Buy |
| Peer Perform | 10 | 2 | 3.14 | 3.95 | 72.00 | Market Underweight | Hold |
| Outperform | N/A | N/A | 2.92 | 3.11 | 35.00 | Market Overweight | Buy |
| Peer Perform | 4 | 5 | 4.30 | 2.65 | N/A | Market Weight | Buy |
| Underperform | 8 | 2 | 1.41 | N/A | 37.00 | Market Underweight | Hold |
| Outperform | 8 | 4 | N/A | N/A | 41.00 | Market Overweight | Sell |
| Peer Perform | | | | | | Market Weight | Hold |
| Peer Perform | N/A | | | | | Market Overweight | |

Research Changes are Highlighted - Upgrades/raises in est. are highlighted in green and Downgrades/lower est. are highlighted in red via macros.

Hyperlinks Inserted - For Seamless access to additional research reports hyperlinks are added into Ratings Xplorer by macro.

FIG. 2c

* Indicates a Net Short Position in the Stock
Edit/Load Portfolio

Portfolio View > Health Care > Pharmaceuticals & Biotechnology > Pharmaceuticals Pharmaceuticals

Johnson & Johnson
% of Portfolio: 1.71
10 Yr. Treasury Correlation: -0.40

Abbott Laboratories
% of Portfolio: 0.62
10 Yr. Treasury Correlation: -0.55

Wyeth
% of Portfolio: 0.57
10 Yr. Treasury Correlation: -0.42

Eli Lilly
% of Portfolio: 0.55
10 Yr. Treasury Correlation: -0.43
Close: 52.24
BSC EPS Growth Current Fy: 0.05
BSC EPS Growth Next FY: 0.10
Consensus EPS Growth FY05: 7.83
Trailing 12 mth EPS Growth: 8.97
Diff btw Close & Target: -0.13
P/E: 19.54
PEG Ratio: 1.71
Market Cap ($): 59,810.00
Yield %: 2.95
Short Interest Ratio: 0.01
Beta: 0.74
Free Cashflow Growth (%): -72.95
Price to Book: 5.27
Diff Btw BSC & Consensus EPS Est.: 0.01
MARP Net Revision Rank: 7.00
MARP Net Value Rank: 2.00

Pfizer Inc.
% of Portfolio: 1.70
10 Yr. Treasury Correlation -0.50

Eli Lilly
% of Portfolio: 0.55
10 Yr. Treasury Correlation: -0.43

Merck & Co.
% of Portfolio: 0.54
10 Yr. Treasury Correlation: -0.49

Bristol-Myers Squibb
% of Portfolio: 0.43
10 Yr. Treasury Correlation: -0.16

Schering-Plough
% of Portfolio: 0.29
10 Yr. Treasury Correlation: -0.43

Forest Laboratories Inc.
% of Portfolio: 0.12
10 Yr. Treasury Correlation: -0.43

Allergan Inc.
% of Portfolio: 0.11
10 Yr. Treasury Correlation: -0.11

Mylan | Wat... | King!
% of... | % o... | % o...
10 Yr. | 10 Y... | 10 Y!

Example of Portfolio Exposure to 10 Year Treasury

FIG. 3

RatingsXplorer Advanced Search    Clear Criteria

Return to Ratings Xplorer

Use the tool below to search for securities which meet specific criteria. Once you have selected the appropriate criteria click "Search" to see the list of securities that match your selection(s).

ANALYST OPINIONS

Bear Steams Equity Research Ratings

Select Stocks with Bear Steams Rating:
[ Outperform Only ▼ ]

Select Stocks with BSC EPS Growth Rate for Current FY of:
[ Greater Than or Equal To ▼ ] [    ] and [    ]

Select Companies Where BSC Current FY EPS Estimate is
[ Less Than ▼ ] Consensus Estimate by [    ] %

Select Stocks with Bear Steams Sector Rating:
[ All Sectors ▼ ]

Select Stock with BSC EPS Growth Rate for Next FY of:
[ Greater Than or Equal To ▼ ] [    ] and [    ]

Global Strategist ratings

Select Stocks with a MARP Net Revision Rank of:
[ 4 ▼ ] [ Or Less ▼ ]

Select Stocks with a MARP Relative Value Rank of:
[    ▼ ] [ Or Less ▼ ]

Independent Research ratings

Select Stocks with Independent Research Rating:
[ All Stocks ▼ ]

Select Stocks covered by Independent Research Provider:
[ All ▼ ]

Street Consensus Ratings

Select Stocks with Street Consensus Rating (1=Buy, 5=Sell):
[ Less Than or Equal To ▼ ] [    ] and [    ]

Select Companies with a Price to Earnings Growth Ratio of:
[ Less Than or Equal To 1.0 ▼ ]

Select Stocks with an Estimated Consensus EPS Growth Rate (%) of:
[ Greater Than or Equal To ▼ ] [    ] and [    ] [ Less Than ▼ ]

Select Companies where Current Price is Consensus Target Price by [    ] %

FROM FIG. 4a

BASIC CRITERIA

Select a Company Size (in $billions):
Less Than or Equal To [▼] [ ] and [ ]

Select Companies with a P/E Ratio of:
[▼] and [▼]

Select Companies with a Yield of:
2% Or More [▼]

Select an Industry:
All [▼]

Select a Price Range:
All [▼] and Or More [▼]

Select Companies with a Price to Book Ratio:
Greater Than or Equal To [▼] [ ] and [ ]

Select Companies with a Trailing EPS Growth Rate (Last 12 mths - %) of:
Greater Than or Equal To [▼] [ ] and [ ]

Select Companies with a 1 Yr. Free Cashflow Growth Rate (%):
Greater Than or Equal To [▼] [ ] and [ ]

Select Companies with a Free Cashflow Yield (%):
Greater Than or Equal To [▼] [ ] and [ ]

PRICE PERFORMANCE

Select Companies with Corrolation to Economic Cycle:
[▼] [ ] and [ ]

Select a Companies with Short Interest Ratio (%):
Greater Than or Equal To [▼] [ ]

Select Companies with Beta
Greater Than or Equal To [▼] [ ] and [ ]

[ Search ]

FIG. 4b

RatingsXplorer                                                    Print Results

Search by Symbol: [      ]  [Search]    ● Search Portfolio           🔍 Advanced Search
Search by Company: [      ] [Search]    ○ Search All Coverage        ● View Portfolio
                                                                     ✏ Edit/Load Portfolio

[BSC Outperforms] [BSC Peer Performs] [BSC Underperforms]   🐂 Most Bullish
Rating Shortcuts: [View All Equity Research Coverage]       🐻 Most Bearish View Today's Research Changes: [No Filter ▸]

▨ = Downgrade of Rating or EPS Forecast    ▨ = Upgrade of Rating or EPS Forecast
Please click on the rating to view the reports and for important disclosure information, analyst certification and recommendation analysis. See end of report for data sources.

| Company | BSC Security Rating Doubleclick to view Research | MARP Net Revision Rank | MARP Rel. Value Rank | BSC EPS Estimate | | BSC Target Price | BSC Sector Rating |
|---|---|---|---|---|---|---|---|
| | | | | Current FY | Next FY | | |
| General Electric Co. (GE) | Outperform | 3 | 7 | 1.84 | 2.13 | 40.00 | Market Weight |
| Murphy Oil Corporation (MUR) | Outperform | 2 | 5 | 5.05 | 3.30 | 120.00 | Market Underwei |
| Unitedhealth Group (UNH) | Outperform | 2 | 9 | 4.90 | 5.60 | 105.00 | Market Overweigh |
| Xilinx (XLNX) | Outperform | 3 | 2 | 1.00 | 1.25 | N/A | Market Weight |
| Zebra Technologies (ZBRA) | Outperform | 4 | 4 | 1.85 | 2.18 | N/A | Market Weight |

FIG. 5

TrendsXplorer

| Sort Selected Column: | Launch Search | | | | | | | See end of report |
|---|---|---|---|---|---|---|---|---|
| Ascending / Descending | ⦿ View Portfolio<br>○ Edit/Load Portfolio<br>Search Trends<br>Show All Data | | | | | | | |

*companies in italics use Subindustry correlation values due to insufficient trading history.*

Correlation Legend
Strong : Absolute value is greater than or equal to 0.4
Moderate : Absolute value is between 0.15 and 0.4
Weak : Absolute value is less than or equal to 0.15

P Value Legend
99% Confidence - P - Value of < +.01
95% Confidence - P - Value of < +.05
90% Confidence - P - Value of < +.10

| Company | Double Click To View Trends | Close*($) | CPI | | PPI | | Consumer Expectations | |
|---|---|---|---|---|---|---|---|---|
| | | | Correlation Co-eff. | P Value | Correlation Co-eff. | P Value | Correlation Co-eff. | P Value |
| General Electric Co. (GE) | View Trends | 34.78 | 0.258 | 0.000 | 0.161 | 0.210 | 0.289 | 0.036 |
| Murphy Oil Corp. (MUR) | View Trends | 49.82 | 0.194 | 0.015 | 0.200 | 0.001 | -0.307 | 0.000 |
| UnitedHealth Group Inc. (UNH) | View Trends | 55.86 | 0.284 | 0.091 | 0.193 | 0.000 | -0.516 | 0.000 |
| Xilinx Inc. (XLNX) | View Trends | 25.46 | 0.119 | 0.000 | 0.200 | 0.021 | 0.256 | 0.010 |
| Zebra Technologies Corp. (ZBRA) | View Trends | 44.72 | -0.230 | 0.007 | -0.122 | 0.039 | 0.106 | 0.011 |

TrendsXplorer

Search: ⦿ Search Portfolio  ○ Search All Companies

By Symbol: MUR, UNH, XLNX, ZBRA, GE  [Search]

By Company: [Search]

Search for Companies in sector: All Sectors / Consumer Discretionary / Financials / Information Technology / Industrials / Materials that have a: All Values correlation with: All Factors ☑ Include securities that use Sub-Industry Statistically significant at: All Values  [Search]

DeltaXplorer

S&P 500 vs Russell 1000 Index  
Sort ◁▷  
Benchmark = Russell 1000 Index

Decimal Place: 4 ◁▷

☐ Print Results  
Load/Edit Portfolio  
⬛ Modify Report  Detail Report - Portfolio  
Disclaimer ▨ =5% or more above Benchmark   ▨ =5% or more above Benchmark   ▨ =Five Most Exposed Sectors vs Benchmark   ▨ =Five Least Exposed Sectors vs Benchmark

| Sector | % of Portfolio* | | Oil | | PPI | | 10yr Treasury | | Consumer Expectations | | Yield Curve | | Building Permits | | Purchasing Managers | |
|---|---|---|---|---|---|---|---|---|---|---|---|---|---|---|---|---|
| | Portfolio | Benchmark | Portfolio | Benchmark | Portfolio | Benchmark | Portfolio | Benchmark | Portfolio | Benchmark | Portfolio | Benchmark | Portfolio | Benchmark | Portfolio | Benchmark |
| Consumer Discretionary | 10.5589 | 11.3341 | -0.2257 | -0.1979 | -0.1845 | -0.1717 | -0.1356 | -0.1280 | -0.0237 | -0.0361 | 0.0305 | 0.0318 | 0.1361 | 0.1322 | 0.0128 | 0.018 |
| Consumer Staples | 9.9450 | 8.5575 | -0.2150 | -0.2173 | -0.1444 | -0.1466 | -0.2076 | -0.2105 | -0.2226 | -0.2198 | 0.0030 | 0.0036 | -0.1112 | -0.1051 | -0.0659 | -0.064 |
| Energy | 10.1528 | 8.8304 | 0.2376 | 0.2311 | 0.3376 | 0.3356 | -0.0623 | -0.0619 | -0.2818 | -0.2893 | -0.0196 | -0.0176 | -0.1702 | -0.1617 | -0.2067 | -0.207 |
| Financials | 19.4729 | 21.5537 | -0.2265 | -0.2093 | -0.1187 | -0.1114 | -0.2783 | -0.2640 | -0.0280 | -0.0398 | -0.0126 | -0.0100 | 0.0549 | 0.0477 | -0.0422 | -0.031 |
| Health Care | 13.7482 | 13.0294 | -0.1672 | -0.1394 | -0.0329 | -0.0087 | -0.1749 | -0.1567 | -0.2065 | -0.1865 | 0.0277 | 0.0287 | -0.1976 | -0.1759 | -0.2297 | -0.211 |
| Industrials | 11.2506 | 10.8649 | -0.0372 | -0.0399 | -0.0165 | -0.0096 | -0.0792 | -0.0784 | -0.0405 | -0.0624 | -0.0026 | -0.0004 | 0.0427 | 0.0349 | -0.0545 | -0.044 |
| Information Technology | 15.8882 | 15.8912 | 0.0693 | 0.0905 | -0.0309 | -0.0049 | 0.1682 | 0.1756 | 0.1513 | 0.1534 | -0.0398 | -0.0244 | -0.0685 | -0.0517 | 0.1016 | 0.106 |
| Materials | 2.8529 | 3.2089 | -0.0532 | -0.0661 | -0.1000 | -0.0894 | 0.0203 | -0.0014 | -0.0848 | -0.0965 | 0.0214 | 0.0209 | 0.0880 | 0.0790 | 0.1883 | 0.164 |
| Telecomunication Services | 2.4339 | 3.2118 | -0.1315 | -0.1705 | -0.1323 | -0.1122 | -0.1392 | -0.1499 | -0.1466 | -0.1282 | 0.0568 | 0.0584 | 0.1395 | 0.1475 | -0.1593 | -0.186 |
| Utilities | 3.7165 | 3.5180 | -0.0855 | -0.0809 | -0.1268 | -0.1265 | -0.3300 | -0.3356 | -0.3419 | -0.3473 | 0.0531 | 0.0527 | -0.0067 | -0.0033 | -0.2660 | -0.265 |
| Portfolio Totals | | | -0.0893 | -0.0843 | -0.0553 | -0.0314 | -0.1168 | -0.1129 | -0.0861 | -0.0829 | 0.0002 | 0.0048 | -0.0309 | -0.0192 | -0.0644 | -0.054 |

| Sector | % of Portfolio* | | Gold | | Copper | | US$ per UK (£) | | US$ per Euro (€) | | Trade Weighted $ | | Existing Home Sales | | Credit Spread | |
|---|---|---|---|---|---|---|---|---|---|---|---|---|---|---|---|---|
| | Portfolio | Benchmark | Portfolio | Benchmark | Portfolio | Benchmark | Portfolio | Benchmark | Portfolio | Benchmark | Portfolio | Benchmark | Portfolio | Benchmark | Portfolio | Benchmark |
| Consumer Discretionary | 10.5589 | 11.3341 | -0.0563 | -0.0224 | -0.1770 | -0.1645 | -0.1094 | -0.0993 | -0.0190 | -0.0036 | 0.1194 | 0.0913 | 0.1423 | 0.1363 | 0.0917 | 0.085 |
| Consumer Staples | 9.9450 | 8.5575 | -0.0644 | -0.0677 | -0.1415 | -0.1492 | 0.0706 | 0.0644 | 0.1108 | 0.1032 | 0.1655 | 0.1662 | -0.1077 | -0.0994 | 0.2332 | 0.231 |
| Energy | 10.1528 | 8.8304 | 0.1954 | 0.2031 | 0.1853 | 0.1847 | 0.0091 | 0.0000 | -0.0047 | 0.0069 | -0.1437 | -0.1518 | -0.1056 | -0.1088 | -0.0546 | -0.054 |
| Financials | 19.4729 | 21.5537 | -0.1154 | -0.0852 | -0.2032 | -0.1806 | -0.2071 | -0.1832 | -0.1229 | -0.0996 | -0.2271 | 0.1933 | 0.0536 | 0.0428 | 0.1352 | 0.116 |
| Health Care | 13.7482 | 13.0294 | -0.1560 | -0.1231 | -0.1190 | -0.0943 | -0.0128 | -0.0300 | 0.0170 | 0.0080 | -0.2415 | 0.2056 | -0.1720 | -0.1484 | 0.2575 | 0.225 |
| Industrials | 11.2506 | 10.8649 | -0.0299 | 0.0142 | -0.1234 | -0.0940 | -0.0963 | -0.0939 | -0.1098 | -0.0901 | -0.0937 | 0.0645 | 0.0412 | 0.0272 | 0.0525 | 0.030 |
| Information Technology | 15.8882 | 15.8912 | -0.1412 | -0.0921 | -0.0057 | 0.0227 | -0.0397 | -0.0313 | -0.1145 | -0.0909 | -0.0080 | -0.0445 | -0.0635 | -0.0492 | -0.0190 | -0.05 |
| Materials | 2.8529 | 3.2089 | 0.2347 | 0.2289 | 0.0618 | 0.0644 | 0.1397 | 0.1265 | 0.2304 | 0.2125 | -0.2016 | -0.1866 | -0.0254 | -0.0211 | -0.1359 | -0.121 |
| Telecomunication Services | 2.4339 | 3.2118 | -0.0734 | -0.1167 | -0.2084 | -0.1780 | -0.1736 | -0.1904 | -0.0616 | -0.0703 | 0.1279 | 0.1687 | -0.0254 | -0.0211 | 0.1934 | 0.210 |
| Utilities | 3.7165 | 3.5180 | 0.1177 | 0.1307 | -0.0250 | -0.0271 | -0.1167 | -0.1160 | 0.0746 | 0.0830 | -0.0072 | -0.0141 | 0.0299 | 0.0301 | 0.2039 | 0.200 |
| Portfolio Totals | | | -0.0522 | -0.0297 | -0.0890 | -0.0775 | -0.0674 | -0.0704 | -0.0357 | -0.0281 | 0.0981 | 0.0785 | -0.0191 | -0.0101 | 0.1003 | 0.084 |

TO FIG. 11b

DeltaXplorer

Detail Report - Example Portfolio (S&P 500)(5 - 10 Years of Date)
*Stock in Italics show Subindustry correlation value due to Insufficient trading history:*

Decimal Places: 3   Sort: ◀▶

[Modify Report] [Dashboard] [Load/Edit Portfolio]
Disclaimer
[Print Results]

| Stock | Symbol | % of Portfolio | Oil Correlation | PPI Correlation | 10 yr. Treasury Correlation | Consumer Expectations Correlation | Yield Curve Correlation | Building Permits Correlation | Purchasing Managers Correlation | Gold Correlation | Copper Correlation |
|---|---|---|---|---|---|---|---|---|---|---|---|
| Agilent Technologies Inc. | A | 0.146 | 0.102 | 0.224 | 0.608 | 0.560 | 0.159 | 0.331 | 0.527 | 0.498 | |
| Alcoa Inc. | AA | 0.186 | 0.158 | 0.035 | 0.336 | 0.005 | 0.003 | 0.164 | 0.203 | -0.078 | |
| Apple Computer Inc. | AAPL | 0.407 | 0.433 | 0.324 | 0.324 | -0.131 | 0.081 | -0.008 | -0.058 | 0.284 | |
| AmerisourceBergen Corp. (holding Co.) | ABC | 0.074 | -0.234 | 0.060 | -0.393 | -0.421 | 0.001 | -0.273 | -0.452 | -0.144 | |
| Applied Biosystem Group - Applera Corp. | ABI | 0.042 | 0.639 | 0.361 | 0.401 | 0.193 | -0.008 | -0.415 | -0.022 | -0.077 | |
| Ambac Financial Group Inc. | ABK | 0.069 | -0.397 | -0.177 | -0.527 | -0.307 | 0.000 | -0.064 | -0.336 | -0.149 | |
| Albertsons Inc. | ABS | 0.085 | -0.564 | -0.346 | -0.399 | -0.424 | 0.024 | 0.240 | -0.133 | -0.002 | |
| Abbott Laboratories | ABT | 0.624 | -0.539 | -0.244 | -0.562 | -0.385 | 0.002 | -0.165 | -0.450 | -0.257 | |
| ACE Ltd. | ACE | 0.125 | -0.297 | 0.043 | -0.381 | -0.142 | 0.014 | -0.169 | -0.374 | -0.156 | |
| Affiliated Computer Services Inc. | ACS | 0.053 | -0.360 | -0.213 | -0.370 | -0.484 | 0.011 | -0.032 | -0.260 | -0.003 | |
| Alberto-Culver Co. | ACV | 0.030 | -0.142 | -0.023 | -0.287 | -0.332 | -0.005 | -0.189 | -0.109 | 0.097 | |
| Adobe Systems Inc. | ADBE | 0.134 | 0.675 | 0.371 | 0.484 | 0.134 | 0.031 | -0.410 | 0.059 | 0.065 | |
| Adc Telecommunications Inc. | ADCT | 0.024 | 0.512 | 0.424 | 0.434 | 0.273 | -0.065 | -0.447 | 0.044 | 0.030 | |
| Analog Devices Inc. | ADI | 0.125 | 0.605 | 0.263 | 0.490 | 0.283 | -0.025 | -0.401 | 0.154 | -0.024 | |

*FIG. 12*

COMPUTER-AIDED FINANCIAL SECURITY ANALYSIS SYSTEM AND METHOD

CROSS REFERENCE TO RELATED PROVISION APPLICATION

This application claims the benefit of U.S. Provisional Patent Application No. 60/679,434, filed on May 9, 2005, the disclosure of which is incorporated herein by reference in its entirety.

BACKGROUND OF THE INVENTION

The present invention generally relates to a new computer-aided system and method for analyzing an individual financial security/holding or portfolio of securities/holdings and providing a real-time intuitive view of a security's/portfolio's exposure to exogenous economic and market influences.

In recent years, taking advantage of the proliferation of advanced desktop computer technology and the Internet, and recognizing the increasing degree to which amateur and professional investors have become more "self-directed" in their investing approaches, financial services and market data firms have begun to offer their clients heat maps and other security screening tools. Such tools enable users to monitor data more effectively. It will be appreciated that the suite of analytic tools of the present invention leverage this advancement in desktop computer technology and the Internet to provide these new self-directed portfolio managers with new dynamic views of a security's or portfolio's relationship with relevant exogenous influences.

Conventional security screening, heat map and portfolio reporting technology provide only fundamental research analysis or market statistics such as ratings, earnings-per-share (EPS) estimates, P/E ratio, market capitalization or yield. In addition, these conventional tools provide only views on the broader market and do not provide views on the user's existing holdings, interest list or portfolio.

As a result, investors and portfolio managers have heretofore not had the benefit of an intuitive means to view portfolio/holding exposure to various exogenous economic and market factors such as, for example, movements in interest rates, commodity prices, currencies, macroeconomic variables, indices, sector/industry specific drivers and geopolitical influences, and have been left to interpolate these relationships by examining individual charts or, at best, calculating/analyzing them on a security-by-security basis. Therefore, when, for example, oil prices rise or a significant geopolitical event occurs, the investors and portfolio managers lack the capability to obtain a real-time understanding of how such event might impact on their portfolio/holdings based on historical data.

The system and method according to the present invention fills this gap by providing users with the capability to leverage fundamental or quantitative research and manage security/portfolio exposure to exogenous economic, geopolitical, market and industry-specific influences through a textual and/or graphical representation of this exposure in real-time in table, chart, heat map or other suitable format. As described in greater detail hereinafter, the present invention employs portfolio analytic tools which not only provide the market data that are conventionally available, but also provide the user with the aforementioned view of the exposure of a security or portfolio of securities to exogenous economic and market factors.

SUMMARY OF THE INVENTION

Generally speaking, the present invention provides a new computer-aided system and method for analyzing a financial security/holding or portfolio of securities/holdings which provide the user with both relevant fundamental or quantitative research results combined with real-time views on exposure to various exogenous economic and market factors such as, for example, commodity prices, currency or interest rate changes and geopolitical events. In addition, the present invention enables the user to compare portfolio exposure to any of such factors relative to market indices or even a customized benchmark.

In accordance with one embodiment of the present invention, the user can create industry-specific views that combine macro factors and industry-specific factors.

According to another embodiment of the system and method of the present invention, the user is provided with the capability of executing "what-if" scenario analyses.

Results are desirably presented to the user in an intuitive, real-time format. For example, according to various embodiments of the present invention, results are presented through a textual and/or graphical representation of exposure in table, chart, heat map or other suitable format. Moreover, results can be delivered to the user by means of computer spreadsheet programs (e.g., Microsoft Excel), the Internet, wireless devices (e.g., a PDA or a cell phone), client server applications, tangible media (e.g., CD ROM), for example, or other suitable means.

The foregoing and other aspects, features and advantages of the invention will in part be obvious and will in part be apparent from this disclosure and accompanying drawings.

The present invention accordingly comprises the features of construction, and combination and arrangement of elements, as well as the several steps and the relation of one or more of such steps with respect to each of the others, all as exemplified in the following detailed disclosure and accompanying drawings, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 2a-2d are computer screen shots illustrating process steps for creating research analytic tools used in a preferred embodiment of the present invention;

FIG. 3 is a computer screen shot illustrating results generated in heat map format based on a practical example of a portfolio analysis in accordance with an embodiment of the system and method of the present invention; and FIGS. 4a-12 are computer screen shots illustrating various practical examples of use of the system and method according to the present invention.

DETAILED DESCRIPTION OF THE PREFERRED EMBODIMENTS

Figure 1:
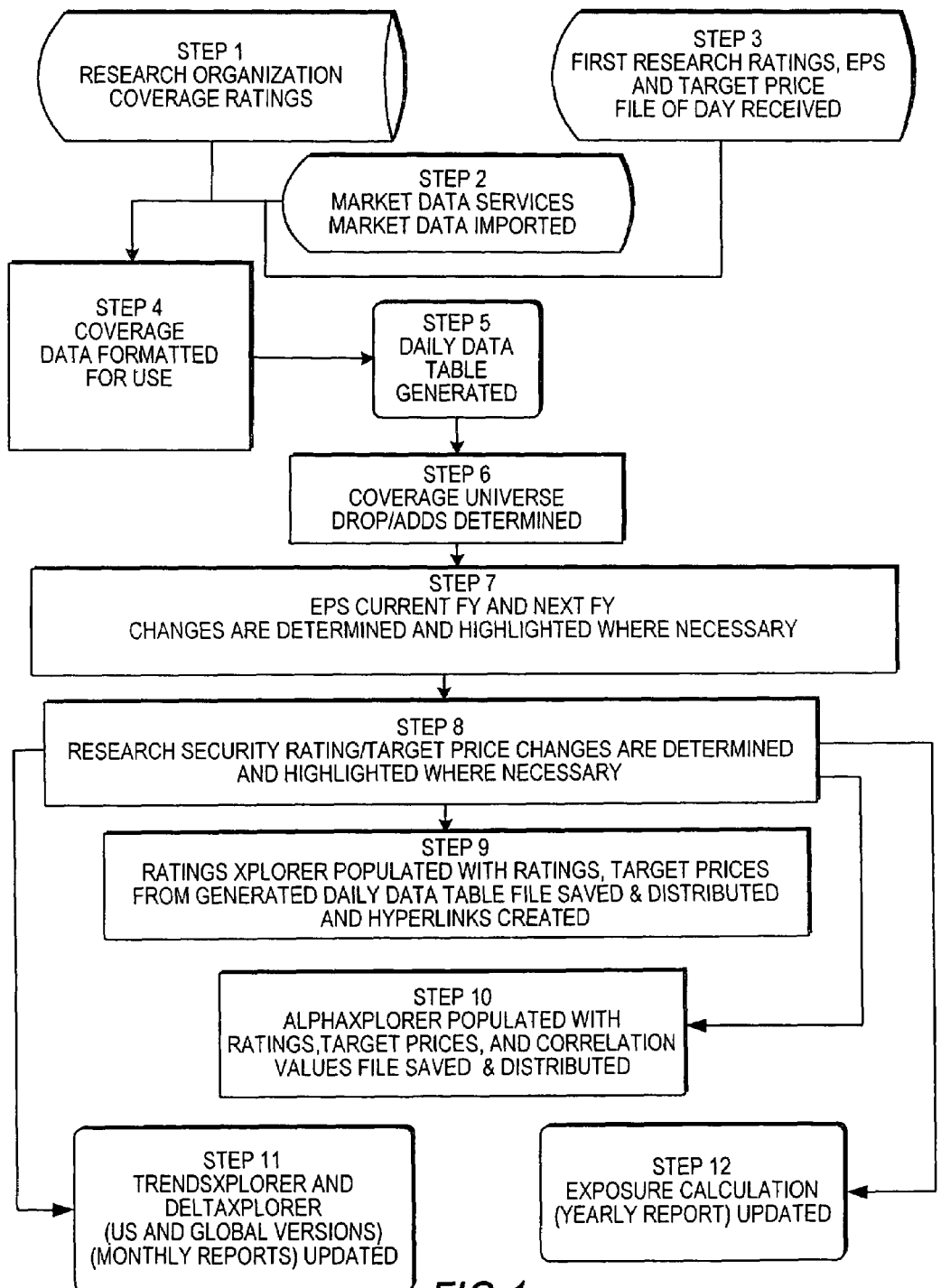
FIG. 1 is a flow diagram illustrating process steps for implementing a system and method for accessing fundamental research, technical research and market data for a security or portfolio of securities, analyzing exposure to exogenous economic and market factors, and generating a real-time intuitive view of results according to a preferred embodiment of the present invention.

The present invention can be implemented using a related combination of automated interfaces and manual processes. It should be appreciated, however, that greater use of automated processing and a wider range of features with multiple executions is also contemplated by the present invention.

The system according to the present invention preferably includes the component elements and means necessary to effect and control the various process steps according to the present invention as described hereinafter. Desirably, and where appropriate, the system utilizes existing computer capabilities, both hardware and software, and electronic communications links, which operate under the control of computer software. The computer software can include sets of software objects and/or program elements collectively having the ability to execute independently in a separate thread or logical chain of process execution, while permitting the flow of data inputs therebetween. Each can be executed as a separate logical server or using a separate physical device.

The present invention incorporates research analytic tools as described in greater detail hereinafter. It will be appreciated that the research analytic tools according to the present invention can be created by importing data from various (multiple) sources, including external market data and research data vendors in addition to internal (to the system provider) research products. Desirably, the data utilized in connection with the system and method according to the present invention are stored in one or more system databases and are updated as frequently as necessary or appropriate.

One tool incorporated in the preferred embodiment of the present invention (a first tool which, for purposes of this application may variously be referred to as the "RatingsXplorer" tool) provides a multi-dimensional view of research (e.g., street consensus) ratings, estimates and analyses. Desirably, a large portion of the ratings, estimates and analyses and underlying data are updated on a daily basis (it should be understood, however, that a portion or portions of such data may be updated on other than a daily basis—e.g., on a monthly basis). As will be appreciated, this first tool provides search portfolio security filters which can include analyst opinions (e.g., ratings, EPS growth estimates, target prices, and PEG—the PEG ratio is a measure of earnings growth against the Price Earnings Ratio), price performance criteria (e.g., economic cycle, Beta, short interest) and exposure to exogenous macroeconomic, market and geopolitical influences. The first inventive tool further provides the capability to view research changes (e.g., ratings changes, EPS estimates and target prices) as well as portfolio maintenance functionality (e.g., to load/save, edit and view portfolio information).

Another, second, tool incorporated in the preferred embodiment of the present invention (which, for purposes of this application may variously be referred to as the "TrendsXplorer" tool) enables the user to search for securities based on their correlations with diverse variables such as the following exogenous factors: (i) macroeconomic influences (e.g., CPI, PPI, durable goods, labor, consumer sentiment, economic cycle, building permits, average weekly claims for unemployment insurance), (ii) interest rates (e.g., Federal Reserve, Treasuries, high yield indices, high grade indices, mortgage backed rates, Libor), (iii) commodity value fluctuation (e.g., oil, gold, industrial commodities, CRB), (iv) currency value fluctuation (e.g., $, Euro, Yen, Pound), (v) index movements (e.g., Dow, S&P, Russell, FTSE, Xetra, HK, CAC, SWX, MSCI, Tokyo), (vi) geopolitical events (e.g., war, terrorism, acts of nature, political instability, financial shocks, political scandal), (vii) industry specific drivers (e.g., technology spend, same-store sales, VAR, option expense), and (viii) impact to industry return on equity ("ROE") based on the above factors. As will be appreciated, this second tool provides an investor with the capability to ascertain the historical relationship or correlation between a portfolio holding and any of the foregoing exogenous factors. This includes the capability to input a security and view correlation across factors—e.g., to search for a set of securities that have the strongest historical correlation to a particular factor and to view and generate results (e.g., trends of individual securities) in a suitable format (e.g., graphical, multi-year view). Correlation data are preferably recalculated periodically; and the tool is preferably updated periodically to adjust for adds and drops to the coverage universe of the provider of the system and method according to the present invention.

A further, third, tool forming a part of the preferred embodiment of the present invention (which, for purposes of this application may variously be referred to as the "AlphaXplorer" tool) provides the user with the capability to obtain a portfolio view of risk and exposure to specific factors, and to conduct comparative analyses. That is, as will be appreciated, this third tool enables a dynamic view of a user's holdings through the lens of research and analysis, allowing the user to easily and quickly isolate ("drill down" to) those securities with the greatest historical exposure to exogenous economic and market factors. This third inventive tool is preferably updated on a daily basis including by means of incorporating the most recent data used in and/or generated by the first and second tools according to the present invention.

A fourth tool forming a part of the preferred embodiment of the present invention (which, for purposes of this application may variously be referred to as the "DeltaXplorer" tool), provides the user with the capability to obtain a sector level view of a portfolio's systematic risk relative to market benchmarks and preselected indices. As will be appreciated, this fourth tool allows the user to tailor the analysis based on timeframe, portfolio benchmark and macro factors.

Figure 2A:
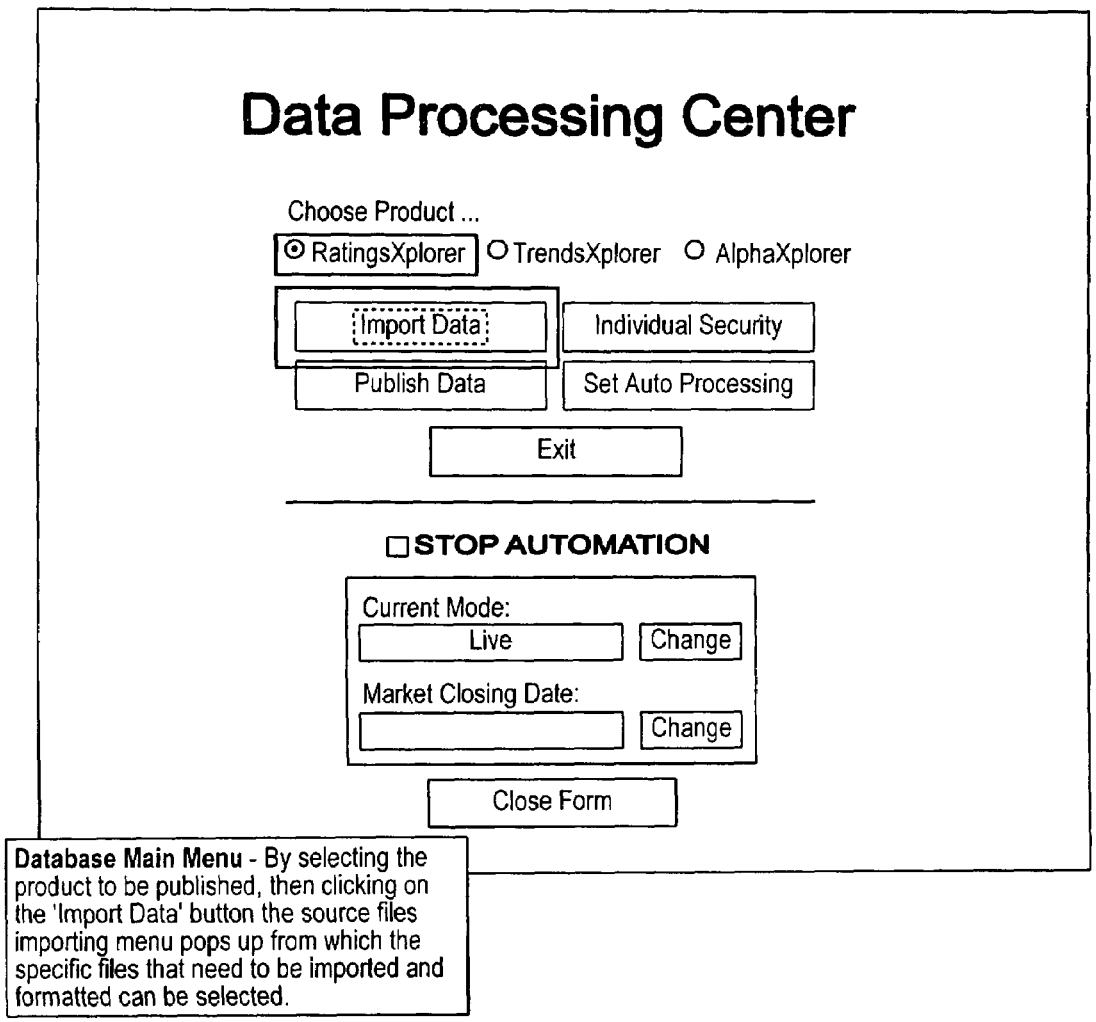
Figure 2B:
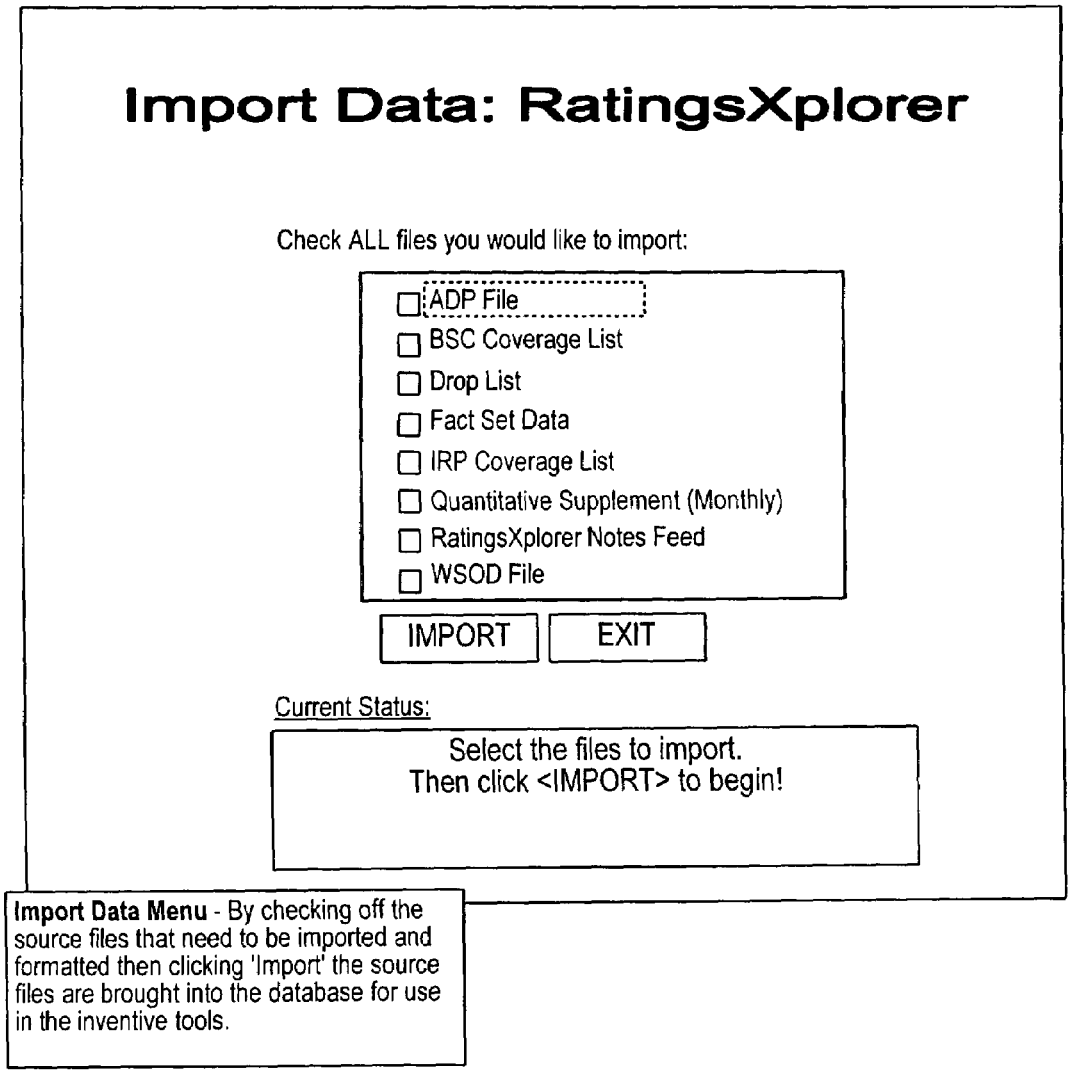

Referring now to FIG. 1, in accordance with one aspect of the inventive method, data are gathered. In a first step (step 1), coverage ratings (security, sector and price target) as of market close are received via a data feed from internal and/or external research sources. As depicted in FIG. 2a, the user can, for example, select the product to be published, and then select an "import data" function whereby a source file menu is presented from which specific files to be imported and formatted for use can be selected. The data can then be saved to one or more databases and formatted for use in connection with the inventive tools created in accordance with the steps outlined in FIG. 1 (see also FIG. 2b). New data preferably overwrites old data.

In a second step (step 2), market data are automatically imported from market data sources (e.g., FactSet, Reuters, Bloomberg) for entities covered within each tool according to the present invention. The program that imports the market data (which program can be, for example, a Visual Basic program) desirably utilizes a series of macros to normalize and format the data for inclusion into the inventive tools. Examples of the market data include: EPS, consensus ratings, Beta, short interest ratio, target prices, close, price-to-earnings, yield, market capitalization, year high, year low, difference between close and consensus target, PEG, free cash flow yield, and free cash flow within the platform.

EPS growth estimates for each security's current and next fiscal years can be calculated as follows:

$EPS$ Growth Estimate Current Fiscal Year $(FY)$ =

(Current $FY$ $EPS$ estimate − Last $FY$ $EPS$)/Last $FY$ $EPS$ $EPS$ Growth Estimate Next Fiscal Year $(FY)$ =

(Next $FY$ $EPS$ estimate − Current $FY$ $EPS$ estimate)/Current $FY$ $EPS$ estimate In a third step (step 3) a file (e.g., a daily file) containing research ratings, EPS and target price data is provided.

In a fourth step (step 4) the data from steps 1-3 are formatted for use and display.

In accordance with another aspect of the inventive method, a daily data table containing the combined data from steps 1-4 above as well as research analysis information (e.g., correlation analyses) is generated in a fifth step (step 5).

In a sixth step (step 6), drops/adds in coverage are determined by comparing any immediately previous version of the first tool to the data table generated in step 5.

In a seventh step (step 7), EPS estimate changes are determined by comparing the previous day's EPS estimates to the new EPS estimates imported in step 2.

In an eighth step (step 8), research security rating and target price changes are determined by comparing the previous day's security ratings and target prices to the new ratings and prices imported in step 4.

Figure 2D:
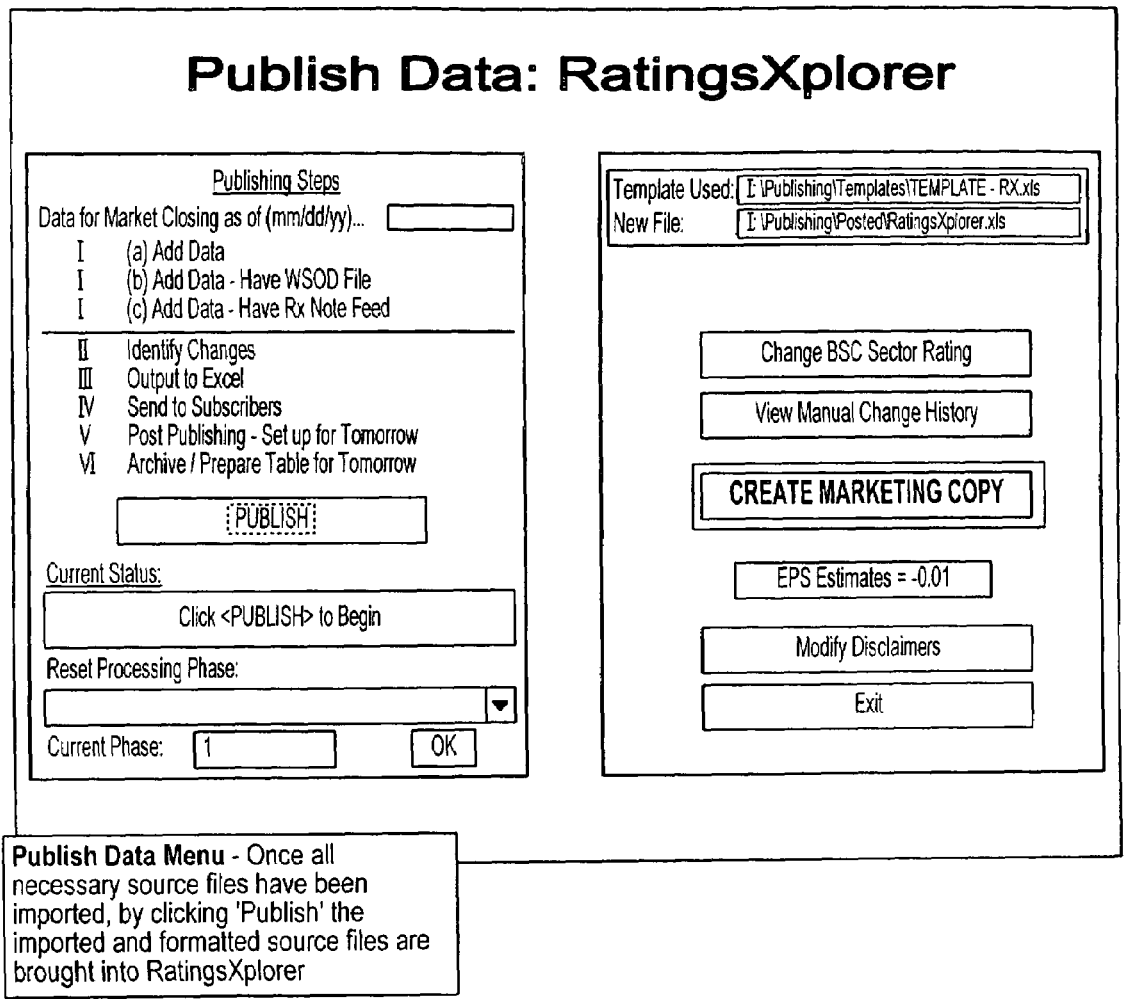

In a ninth step (step 9), the first tool according to the present invention is created by populating the tool with data from the daily data table generated in step 5. As depicted in FIG. 2*d*, once necessary source files have been imported, the user can select a "publish" functionality, for example, to enable access of the imported and formatted files by the first inventive tool. Additionally, the first inventive tool can be updated with EPS estimate changes from step 7 (see FIG. 2*c*)—upgrades can be highlighted in one color (e.g., green) and downgrades in another (e.g., red). Also, referring to FIG. 2*c*, the first tool can be updated with research security rating and target price changes from step 8 (e.g., upgrades highlighted in green and downgrades in red). Furthermore, for Internet accessibility, hyperlinks can be inserted into the first inventive tool for seamless access to additional research (see FIG. 2*c*).

In a tenth step (step 10), the third tool according to the present invention is populated with research ratings data, market data (e.g., EPS, consensus ratings, Beta, short interest ratio, target prices, close, price-to-earnings, yield, market capitalization, year high, year low, difference between close and consensus target, PEG, free cash flow yield, and free cash flow), which data is also contained in the first inventive tool, industry classifications (such as GICs) from market data services (e.g., FactSet, Reuters, Bloomberg), and correlation data, which data is also contained in the second inventive tool discussed below. Data files are preferably saved, archived and distributed.

In a step 11, the second and fourth tools according to the present invention are created through the automated publication process whereby each security's correlation data with respect to exogenous factors are uploaded, and closing prices are updated within the tools from data obtained through market data services (e.g., FactSet, Reuters, Bloomberg). Factor exposure data are preferably updated with the most recent analyses.

Sample portfolios based on the composition of market indices and client groups are updated depending on changes in the make-up of the portfolio and weightings of each company included in the portfolio. The product is then redistributed electronically, e.g., via the Internet or email, or in hard-copy form.

In accordance with another aspect of the inventive method, correlations within the second and third inventive tools are updated on a periodic basis and security exposure is determined by calculating the correlation of the price changes of the security to the change in various factors (FIG. 1, step 12). Correlations for each security versus a factor are de-trended (by comparing the year-over-year (YOY) change in the security price to the relative YOY change in a broad index (e.g., S&P 500)) and seasonality is removed (by comparing the YOY change in the inputs rather than the absolute price) in accordance with the following relationship.

Exposure=[(Stock$_{T1}$/S&P 500$_{T1}$)−(Stock$_{T0}$/S&P$_{T0}$)]/(Stock$_{T0}$/S&P$_{T0}$)regressed against the YOY Δ in factor.

Example

Correlation Between Oil and Eastman Kodak

On the last trading day of a given month, closing prices for Eastman Kodak (EK) over the past ten years are obtained by downloading them into a Microsoft Excel spreadsheet, for example, from an external market data vendor.

On the last trading day of the month, closing prices for an Oil Index over the past ten years are obtained by downloading them into Excel, for example, from an external market data vendor.

On the last trading day of the month, closing prices for the S&P 500 Index over the past ten years are obtained by downloading them into Excel, for example, from an external market data vendor.

Closing price changes (deltas Δ) are calculated for each close between a one year period for all ten years.

For example, using the above relationship for January 1995:

(((January 1995 EK closing)/(January 1995 S&P 500 closing))−((January 1994 EK closing)/(January 1994 S&P 500 closing)))/((January 1994 EK closing)/(January 1994 S&P 500 closing))

if the following are January closings for EK, Oil Index, and S&P 500 Index:

| | | |
|---|---|---|
| 1995: | EK | 49.00 |
| | Oil Index | 16.53 |
| | S&P 500 | 548.725 |
| 1994: | EK | 44.125 |
| | Oil Index | 13.975 |
| | S&P 500 | 545.835 | then the price delta formula for EK and the Oil Index is calculated as follows:

$$\frac{(49/548.725) - (44.125/545.835)}{(44.125/545.835)} = .104633 \; EK$$

$$\frac{(16.53/548.725) - (13.975/545.835)}{(13.975/545.835)} = .182826 \; \text{Oil}$$

These delta values can then be placed into ten year arrays—one array containing all EK price deltas and another containing all Oil Index price deltas. The arrays are plugged into the correlation relationship within a statistical package of a suitable mathematics or spreadsheet program (e.g., Microsoft Excel, SAS, Minitab, Mathematica).

If all price deltas are calculated monthly over the past ten years for EK, Oil Index, and S&P 500, and the methodology outlined above is employed, the result would be a correlation number between EK and oil of 0.106109.

The resulting correlation number of 0.106109 between EK and oil is used in the inventive tools (such as the second and third tools). This indicates a positive but weak relationship between the price of EK and the price of oil.

Figure 10:
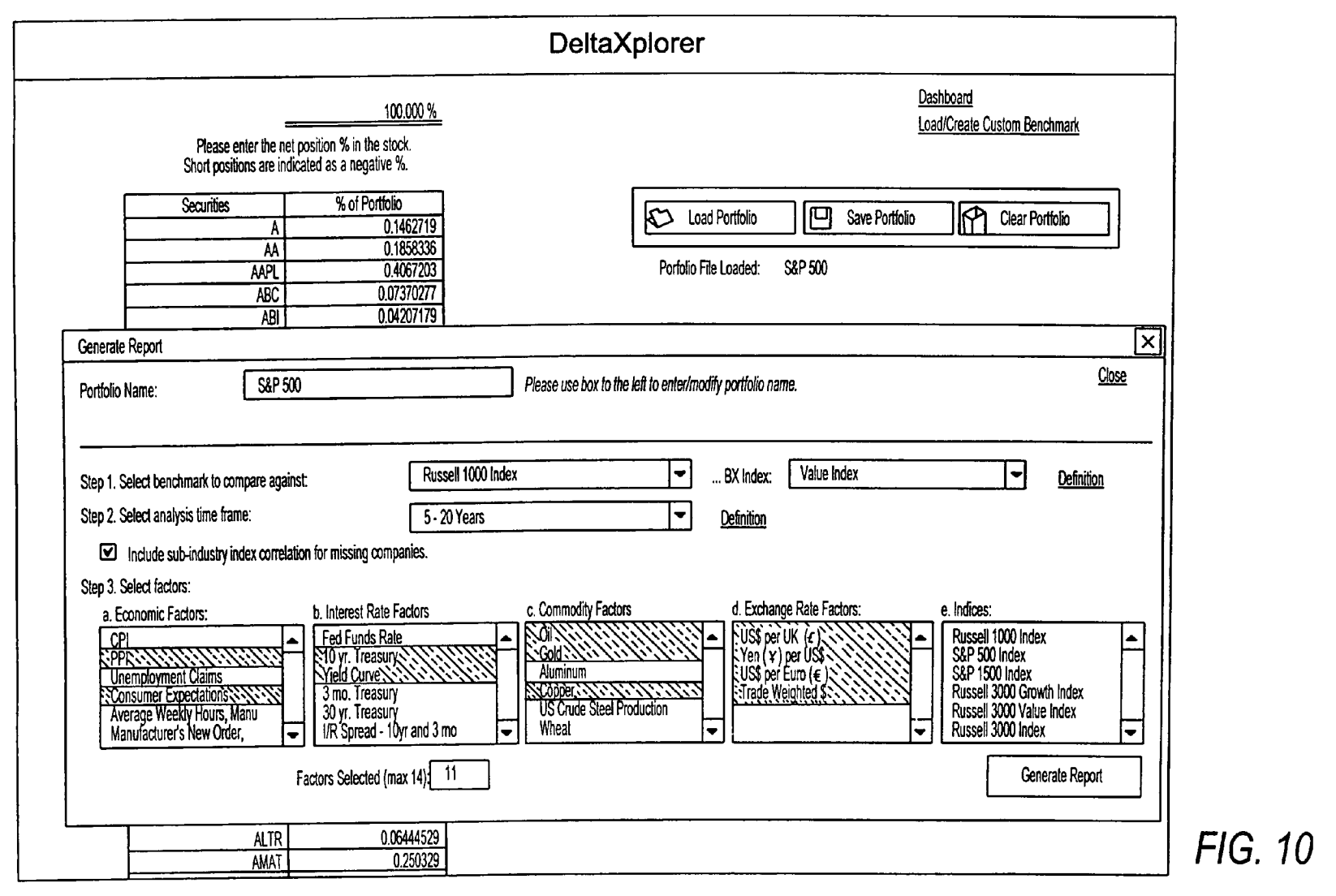

This same methodology can also be applied to various other trading timeframes (e.g., 5 years, 5-10 years, 5-20 years, 30 years) so as to allow the user to customize the user's analysis based on individual preferences. For example, the fourth tool according to the present invention (a/k/a the DeltaXplorer portfolio reporting tool) illustrated in FIG. 10, allows the user to select the historical timeframe in which to compare a portfolio and benchmark.

By way of further example, the system and method according to the present invention enable users to examine the relationship between their portfolio and the relative movement in ten year Treasury Yields, for instance, in either a table or heat map format. FIG. 3 illustrates an example of such a heat map.

In the example illustrated in FIG. 3, box color differences and variations can be used to indicate the exposure of each security to a positive rise in ten year Treasury Yields. The deeper, darker color shades (e.g., of red) indicate a greater inverse relationship between that security and the ten year Treasury Yield. This exposure is calculated by again comparing the YOY change in securities divided by the YOY change in a broad index measure such as, for example, the S&P 500, relative to the YOY change in the ten year Treasury Yield over a specific period (e.g., 10, 20 or 30 years).

For example, in FIG. 3, a strong inverse relationship is indicated between Abbott stock relative to rising ten year Treasury Yields over the last ten years. This relationship can be quantified through the following formula:

$$Exposure_{Month1} = \frac{\text{(Detrended } YOY\ \Delta \text{ in Pfizer/}YOY\ \Delta\text{in } S\&P\ 500) \text{ correlated to } YOY\ \Delta \text{ in}}{10 \text{ years Treasury Yield}}$$

$$Exposure_{Month2} = \frac{\text{(Detrended } YOY\ \Delta \text{ in Pfizer/}YOY\ \Delta\text{in } S\&P\ 500) \text{ correlated to } YOY\ \Delta \text{ in}}{10 \text{ years Treasury Yield}}$$

$$\vdots$$

$$Exposure_{Month120} = \frac{\text{(Detrended } YOY\ \Delta \text{ in Pfizer/}YOY\ \Delta\text{in } S\&P\ 500) \text{ correlated to } YOY\ \Delta \text{ in}}{10 \text{ years Treasury Yield}}$$

In the example illustrated in FIG. 3, for Abbott stock, this results in an exposure (correlation coefficient) of −0.55.

Investors can utilize the present invention to identify current or potential security holdings that have specific attributes. These attributes include: (i) proprietary, consensus street and third party research analyses (e.g., security ratings, EPS estimates, and target prices), (ii) exposure to economic events (e.g., inflation and economic cycles), (iii) commodity price changes: (e.g., crude oil, gold, industrial commodities), (iv) currency price fluctuations (e.g., $ to €, $ to £, and $ to ¥), (v) geopolitical events (e.g., terrorism, political unrest), (vi) market metrics (e.g., yield, FCF growth, market capitalization), and (vii) price performance (e.g., Beta, short interest ratio).

It should be appreciated that the present invention advantageously allows investors to not only view current and potential securities through these lenses, it also allows investors to combine these lenses—creating a new and powerful tool that aids in the management of their portfolios. In addition, the present invention also provides a unique easy-to-use interface to view these attributes within portfolios.

The following are example scenarios illustrating how an institutional client can utilize the system and method according to the present invention:

Scenario 1: An investor would like to identify securities with the following characteristics:

a. an Outperform Rating;

b. a MARP Net EPS Revision Rating of 4 or less (MARP stands for "Momentum At a Reasonable Price"—quantitative ratings for net earnings revisions and relative value);

c. a Price to Earnings Growth Ratio less than or equal to 1;

d. a Yield of 2% or more; and e. good performance in periods of a rising Fed Funds environment.

With reference to FIGS. 4a and 4b, utilizing the system and method according to the present invention, the investor can quickly implement this search by executing the following steps:

Step 1: Using an "Advanced Search" functionality of the first inventive tool ("RatingsXplorer"), the investor/user can set filters for securities with, for example, an Outperform Rating, MARP EPS Revision Rating of 4 or less, a PEG less than 1 and a Yield greater than 2%, and select (e.g., using a pointing device such as, for example, a computer mouse) the "Search" function.

Step 2: The investor can then view the results and finds five securities, for example, that match the investor's criteria—e.g., GE, Murphy Oil, UnitedHealth Group, Xilinx and Zebra Technologies (see FIG. 5).

Step 3: The investor can examine the search results based on concerns over expectations that the Federal Reserve will continue to raise its discount rate. The investor can export these securities to the second inventive tool ("TrendsXplorer") to see which of these securities is best positioned in the expected rising Fed Funds Rate environment (see FIG. 6).

Through the second inventive tool, the investor is now able to see that GE is best positioned (GE's Correlation Coefficient is a positive 0.289 under the Consumer Expectations category indicating that it has typically done well in a rising Fed Funds rate environment). Based on this information the investor might decide to add GE to his/her portfolio.

Figure 7:
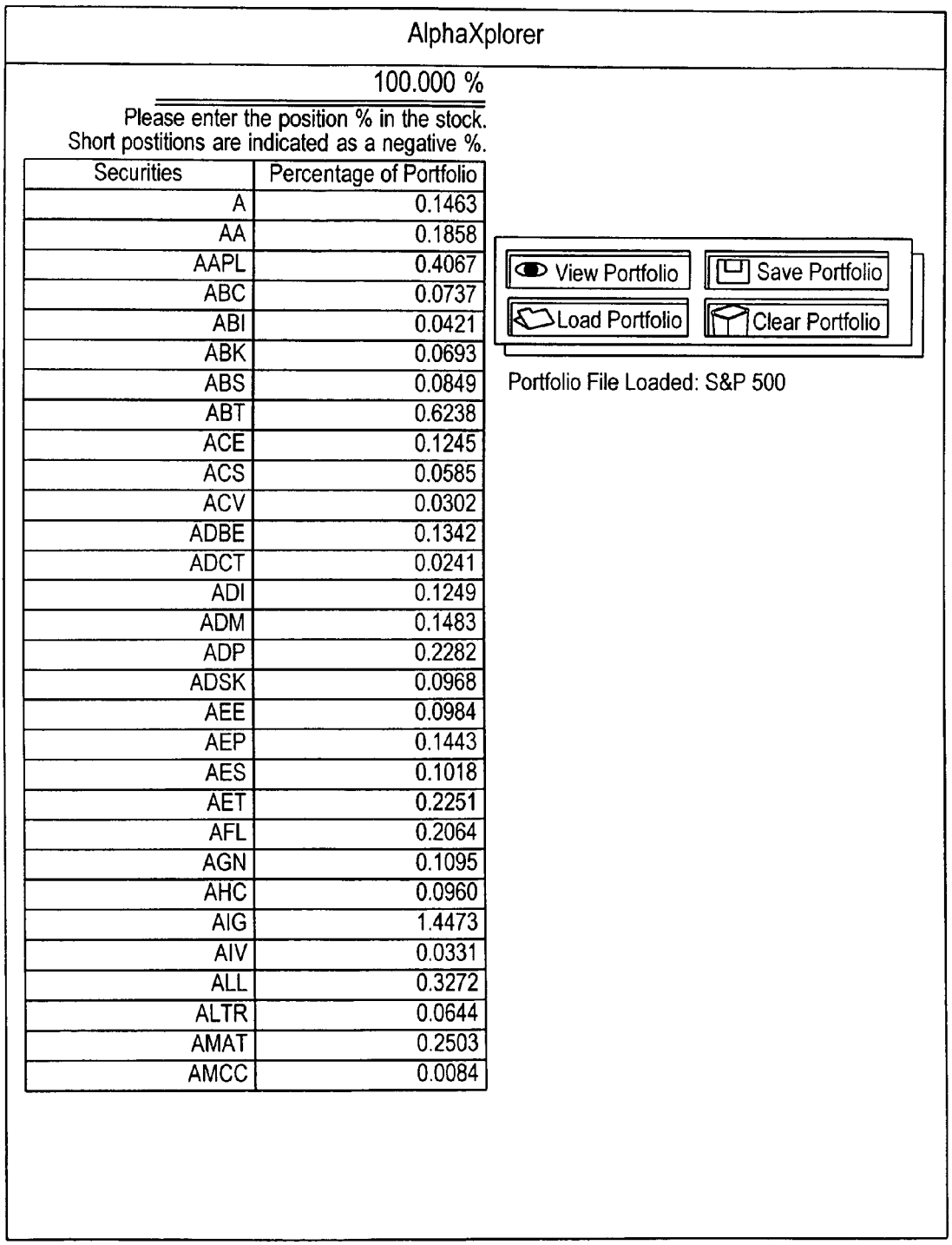

Scenario 2: A hedge fund manager wants to examine a portfolio's exposure to the ten year Treasury Yield. With reference to FIG. 7, utilizing the system and method according to the present invention, the fund manager can quickly implement this process by executing the following steps:

Step 1: The fund manager loads the portfolio into the third inventive tool ("AlphaXplorer") through a portfolio upload feature.

Step 2: The fund manager then views the portfolio under the lens of the ten year Treasury Yield (see FIG. 8).

The present invention allows the fund manager to quickly identify securities that have had historically either a positive or negative relationship with respect to the ten year Treasury Yield.

Figure 8:
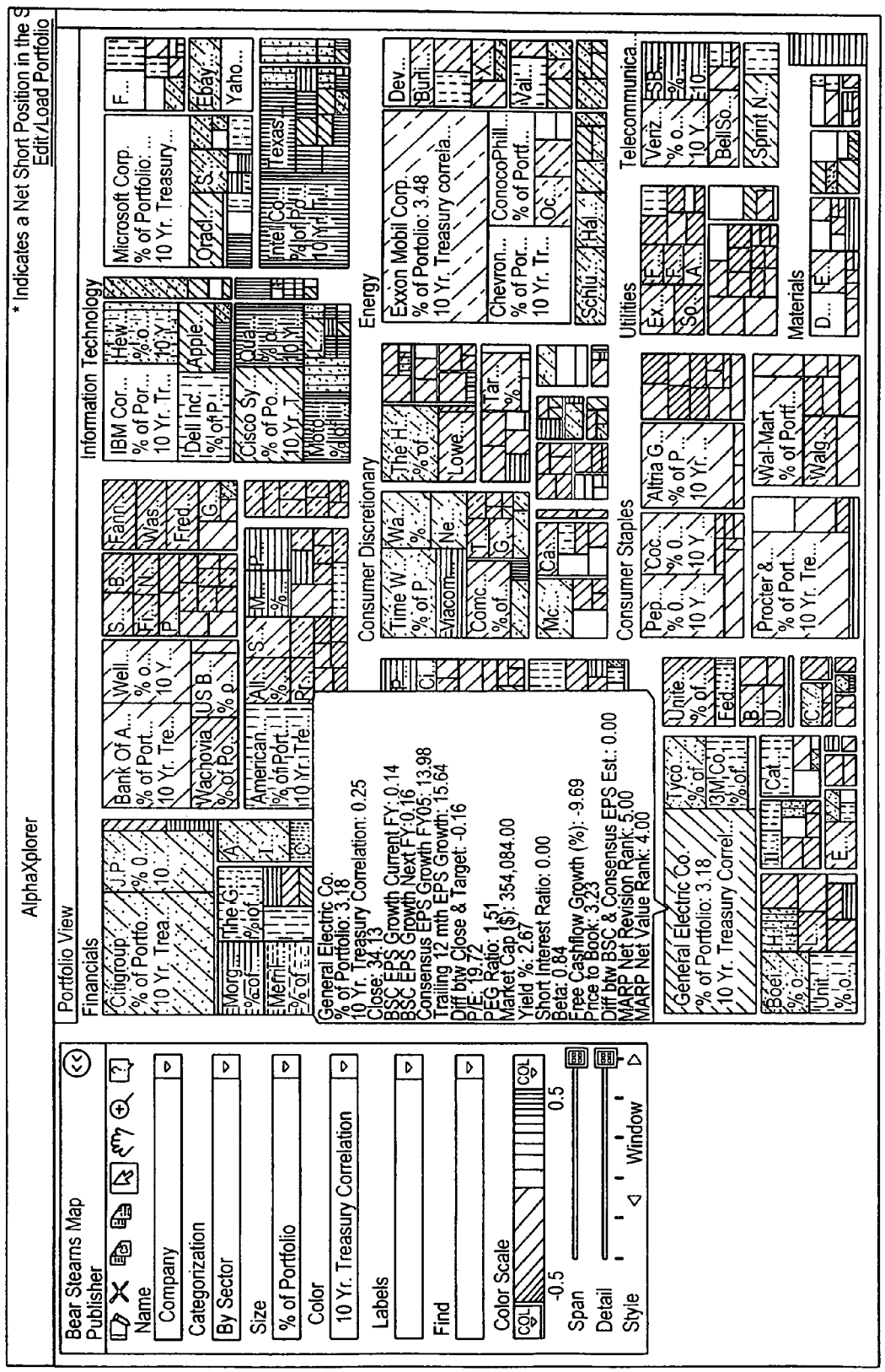

The size of each of the boxes depicted in FIG. 8 can represent the percentage of the manager's portfolio invested in that security. The color of the box can represent the historic exposure of that security to the ten year Treasury Yield. The darker the color (e.g., red or green) indicates the stronger negative or positive relationship that the security has with the factor under examination.

Through this lens, the fund manager can quickly recognize that while overall he/she has noticeable exposure to the ten year Treasury Yield, one of the larger holdings, GE, has a significant positive correlation to the ten year Treasury Yield (positive correlation coefficient of 0.25). Based on this knowledge, the fund manager might adjust his/her position in this stock.

Figure 9:
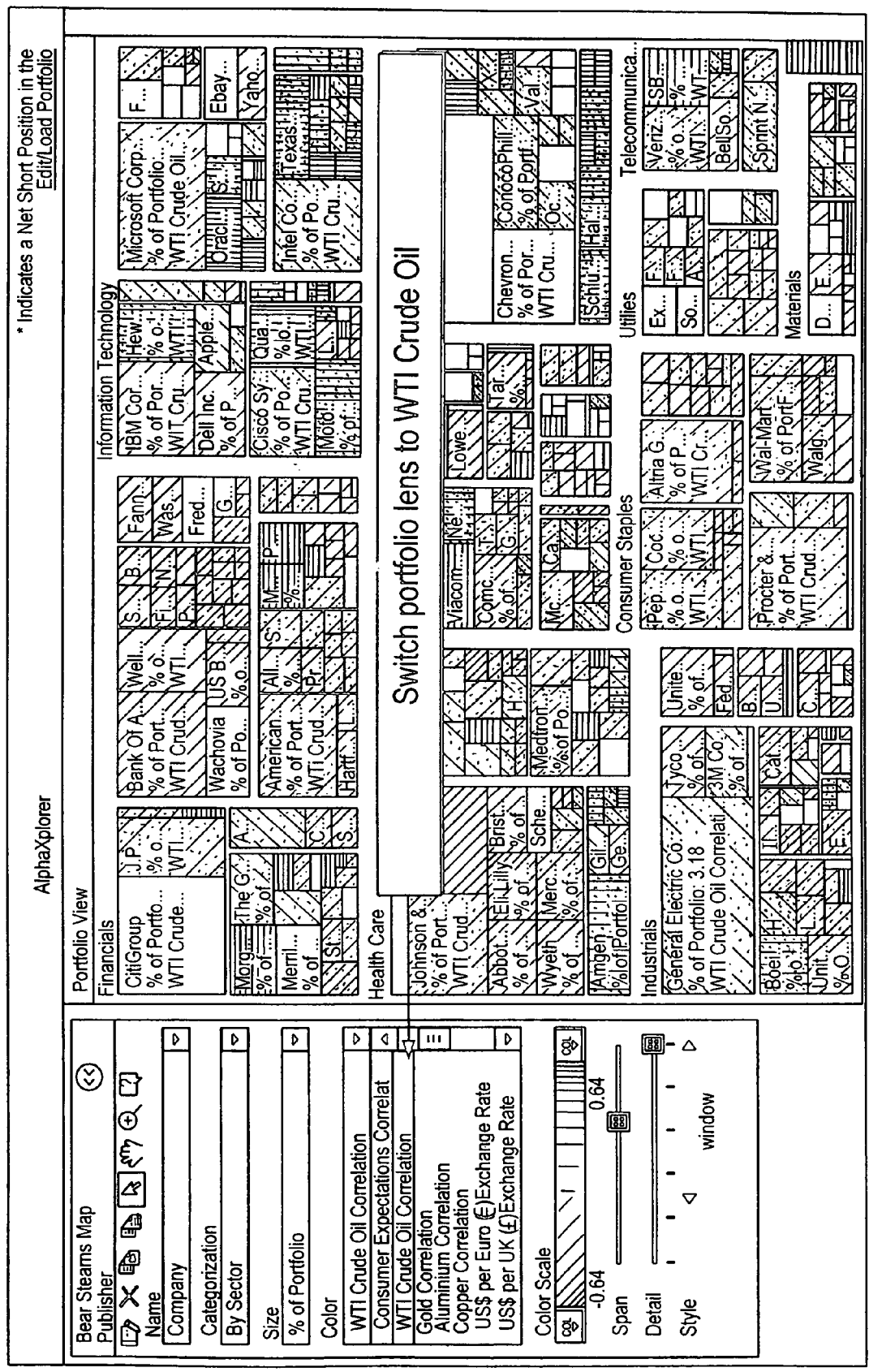

Step 3: The fund manager now wants to look at the portfolio through the lens of rising oil prices. The present invention allows the fund manager to seamlessly switch the lens through which he/she was examining the portfolio from ten year Treasury Yield to impact from rising crude oil prices (see FIG. 9).

Through this new lens, the fund manager has a macro view of the portfolio's historic relationship with respect to rising oil prices. At this macro level, the fund manager can quickly see that across the portfolio there is significant exposure to an environment of rising oil prices.

Based on this macro view, the fund manager might decide to hedge the portfolio oil exposure by, for example, going long on oil futures.

Figure 11B:
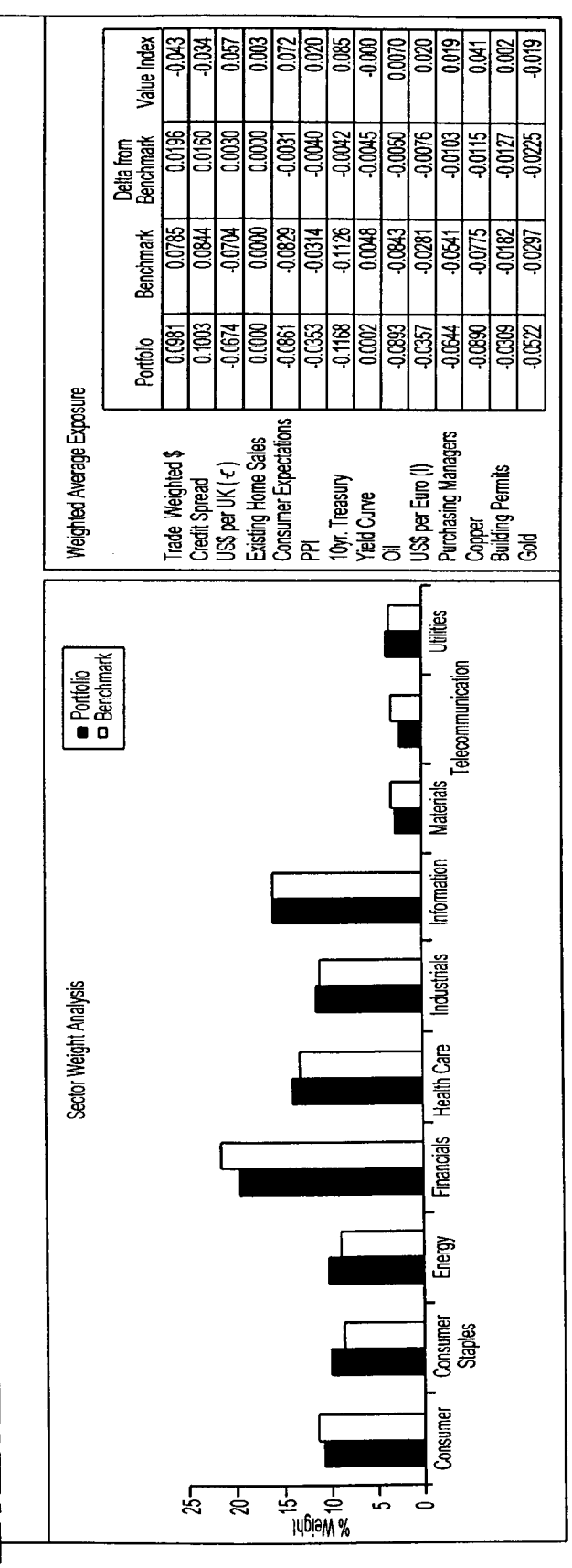

Step 4: The fund manager now wants to quantify the portfolio's exposure to oil, gold and copper prices and rising interest rates. The fund manager loads his/her portfolio into the fourth inventive tool ("DeltaXplorer") and tailors a report based on the portfolio's exposure to oil, gold and copper prices and the ten year Treasury Yield (see FIG. 10) relative to the portfolio's benchmark, the Russell 1000 Index. The fourth inventive tool then displays the portfolio's and the benchmarks' overall exposure overall by sector (see FIGS. 11a and 11b). It should be appreciated that exposure can also be displayed by individual security (see FIG. 12).

Accordingly, the system and method of the present invention provide the user with research analytic capabilities for modeling portfolio holdings that include the capability to conduct multi-dimensional dynamic searches across fundamental research, technical research, market data and exposure to exogenous economic and market factors. Furthermore, the present invention provides the user with the capability to view exposure to directional change in any exogenous economic and market factor on a portfolio in a real-time, intuitive manner via charts, tables and/or heat maps. It should be appreciated that, with the capabilities provided by the present invention, a user can isolate securities most susceptible to market movements and overlay available research analysis on top of this view.

In so far as embodiments of the invention described herein are implemented, at least in part, using software controlled programmable processing devices, such as a computer system, it will be appreciated that one or more computer programs for configuring such programmable devices or system of devices to implement the foregoing described inventive system and method are to be considered an aspect of the present invention. The computer programs can be embodied as source code and undergo compilation for implementation on processing devices or a system of devices, or can be embodied as object code, for example. Those of ordinary skill in the art will readily understand that the term computer in its most general sense encompasses programmable devices such as those referred to above, and data processing apparatus, computer systems and the like. Preferably, the computer programs are stored on carrier media in machine or device readable form, for example in solid-state memory or magnetic memory such as disk or tape, and processing devices utilize the programs or parts thereof to configure themselves for operation.

It should be appreciated that the aspects, features and advantages made apparent from the foregoing and the accompanying drawings are efficiently attained and, since certain changes may be made in the disclosed constructions and processes without departing from the spirit and scope of the invention, it is intended that all matter contained herein and in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A computer-implemented method for analyzing a financial portfolio, comprising the steps of:
   (a) obtaining data associated with a portfolio of securities from a data feed provided by a programmable computer, the data comprising (i) coverage ratings data, (ii) market data, and (iii) correlation data comprising exogenous factors;
   (b) modifying the correlation data by de-trending and removing seasonality from the correlation data;
   (c) providing a daily file;
   (d) storing the coverage ratings data, the market data, the modified correlation data and contents of the daily file in a database;
   (e) up-loading the portfolio of securities into a first software tool, wherein the first software tool is populated with the coverage ratings data, the market data, and the contents of the daily file from the database;
   (f) identifying, via the first software tool, financial securities within the portfolio of securities which satisfy a first search criteria associated with the coverage ratings data, the market data, and the contents of the daily file;
   (g) displaying, on the programmable computer, the identified financial securities which satisfy the first search criteria;
   (h) up-loading, via the programmable computer, at least one of the identified financial securities from step (f) into a second software tool populated with the modified correlation data;
   (i) obtaining, via the second software tool, a correlation between the identified financial security up-loaded from step (h) and selected exogenous factors from the modified correlation data; and
   (j) displaying, on the programmable computer, the correlation between the identified financial security from step (h) and the selected exogenous factors.

2. The method according to claim 1, wherein the step of modifying the correlation data is effected in accordance with the relationship Exposure=[(Stock$_{T1}$/Standard & Poor's (S&P)500$_{T1}$)−(Stock$_{T0}$/S&P 500$_{T0}$)]/(Stock$_{T0}$/S&P 500$_{T0}$) regressed against the YOY Δ in factor.

3. The method according to claim 1, further comprising the steps of:
   (k) up-loading the portfolio of securities into a third software tool populated with the coverage ratings data, the market data, the contents of the daily file, and the modified correlation data from the database;
   (l) calculating, via the third software tool, risk and exposure of the portfolio of securities; and (m) displaying, on the programmable computer, the risk and exposure of the portfolio of securities in an intuitive format.

4. The method according to claim 3, wherein the data further comprises industry classification data and wherein the third software tool is further populated with the industry classification data.

5. The method according to claim 3, wherein the intuitive format is selected from the group consisting of a heat map, a chart, a table and a graph.

6. The method according to claim 1, further comprising the steps of:
(n) up-loading, through the programmable computer, the results of the correlation obtained in step (i) into a fourth software tool populated with the market data from the database;
(o) calculating, via the fourth software tool, exposure of the identified financial security from step (h), wherein exposure is calculated using market benchmarks contained in the market data and the correlation obtained in step (i); and
(p) displaying, on the programmable computer, the exposure of the identified financial security from step (h).

7. The method according to claim 6, wherein the step of displaying includes presenting a sector level view of exposure of the identified financial security from step (i).

8. The method according to claim 1, wherein the market data includes at least one of EPS, consensus ratings, Beta, short interest ratio, target prices, close, price-to-earnings, yield, market capitalization, yew high, yew low, difference between close and consensus target, PEG, free cash flow, and free cash flow yield.

9. The method according to claim 1, wherein the coverage ratings data is obtained from internal research sources, external research sources or a combination thereof.

10. The method according to claim 1, wherein the market data is obtained from external market data sources.

11. The method according to claim 1, further comprising the step of identifying changes in the coverage ratings data and updating the first software tool with the changes in the coverage ratings data.

12. The method according to claim 1, further comprising the step of calculating EPS estimate changes and updating the first software tool with the EPS estimate changes.

13. The method according to claim 12, wherein the step of calculating EPS estimate changes includes the steps of calculating EPS growth estimates for the current fiscal year of the identified financial security from step (h) according to the relationship EPS Growth Estimate Current FY=(Current FY EPS estimate−Last FY EPS)/LAST FY EPS, and calculating EPS growth estimates for the next fiscal year for the identified financial security from step (h) according to the relationship EPS Growth Estimate Next FY=Next FY EPS estimate−Current FY EPS Estimate)/Current FY EPS Estimate.

14. The method according to claim 1, further comprising the step of inserting hyperlinks in the first software tool.

15. A system for analyzing a financial portfolio, comprising:
(a) a programmable computer;
(b) a data feed provided by the programmable computer, wherein the data feed obtains data associated with a portfolio of securities, the data comprising (i) coverage ratings data, (ii) market data, and (iii) correlation data comprising exogenous factors, wherein the correlation data is modified by de-trending and removing seasonality;
(c) a daily file;
(d) a database connected to the programmable computer for storing the data and the contents of the daily file;
(e) a first software tool populated with the coverage ratings data, the market data, and the contents of the daily file from the database, wherein the first software tool is capable of identifying financial securities within the portfolio of securities that have been uploaded into the first software tool though the programmable computer, which satisfy a first search criteria associated with the coverage ratings data, the market data, and the contents of the daily file;
(f) a second software tool populated with the modified correlation data, wherein the second software is capable of obtaining a correlation between the financial securities which have been uploaded into the second software too and selected exogenous factors from the modified correlation data; and
(g) a display.

16. The system according to claim 15, further comprising a third software tool populated with the coverage ratings data, the market data, the contents of the daily file, and the modified correlation data from the database, wherein the third software tool is capable of calculating risk and exposure of the portfolio of securities, and displaying the risk and exposure on the display in an intuitive format.

17. The system according to claim 16, wherein the intuitive format is a heat map, a chart, a table or a graph.

18. The system according to claim 15, further comprising a fourth software tool populated with the market data from the database and correlation obtained by the second software tool, wherein the fourth software tool is capable of calculating exposure of a financial security, wherein exposure is calculated using market benchmarks contained in the market data and the correlation obtained by the second software tool, and displaying the exposure on the display.

19. The system according to claim 18, wherein the fourth software tool is displays a sector level view of the exposure.

20. The system according to claim 15, wherein the market data includes at least one of EPS, consensus ratings, Beta, short interest ratio, target prices, close, price-to-earnings, yield, market capitalization, year high, year low, difference between close and consensus target, PEG, free cash flow and free cash flow yield.

21. The system according to claim 15, wherein the coverage ratings data is obtained from internal research sources, external research sources or a combination thereof.

22. The system according to claim 15, wherein the market data is obtained from external market data sources.

23. The system according to claim 15, wherein the first software tool is updated with changes in coverage ratings data.

24. A computer readable medium having stored thereon a computer readable program code that, when executed by a processor, causes the processor to perform the steps for a method of analyzing a financial portfolio, the method comprising:
(a) obtaining data associated with a portfolio of securities from a data feed provided by a programmable computer, the data comprising (i) coverage ratings data, (ii) market data, and (iii) correlation data comprising exogenous factors;
(b) modifying the correlation data by de-trending and removing seasonality from the correlation data;
(c) providing a daily file;
(d) storing the coverage ratings data, the market data, the modified correlation data and contents of the daily file in a database;

(e) up-loading the portfolio of securities into a first software tool, wherein the first software tool is populated with the coverage ratings data, the market data, and the contents of the daily file from the database;

(f) identifying, via the first software tool, financial securities within the portfolio of securities which satisfy a first search criteria associated with the coverage ratings data, the market data, and the contents of the daily file;

(g) displaying, on the programmable computer, the identified financial securities which satisfy the first search criteria;

(h) up-loading, via the programmable computer, at least one of the identified financial securities from step (f) into a second software tool populated with the modified correlation data;

(i) obtaining, via the second software tool, a correlation between the identified financial security up-loaded from step (h) and selected exogenous factors from the modified correlation data; and (j) displaying, on the programmable computer, the correlation between the identified financial security from step (h) and the selected exogenous factors.

25. The computer readable medium according to claim 24, wherein the steps of the method further comprise:

(k) up-loading the portfolio of securities into a third software tool populated with the coverage ratings data, the market data, the contents of the daily file, and the modified correlation data from the database;

(l) calculating, via the third software tool, risk and exposure of the portfolio of securities; and (m) displaying, on the programmable computer, the risk and exposure of the portfolio of securities in an intuitive format.

26. The computer readable medium according to claim 25, wherein the intuitive format includes one of a heat map, a chart, a table and a graph.

27. The computer readable medium according to claim 24, wherein the steps of the method further comprise:

(n) up-loading, through the programmable computer, the results of the correlation obtained in step (i) into a fourth software tool populated with the market data from the database;

(o) calculating, via the fourth software tool, exposure of the identified financial security from step (h), wherein exposure is calculated using market benchmarks contained in the market data and the correlation obtained in step (i); and (p) displaying, on the programmable computer, the exposure of the identified financial security from step (h).

28. The computer readable medium according to claim 27, wherein the step of displaying includes presenting a sector level view of exposure of the identified financial security from step (i).

29. The computer readable medium according to claim 24, wherein the market data includes at least one of EPS, consensus ratings, Beta, short interest ratio, target prices, close, price-to-earnings, yield, market capitalization, year high, year low, difference between close and consensus target, PEG, free cash flow and free cash flow yield.

30. The computer readable medium according to claim 24, wherein the coverage ratings data is obtained from at least one of internal and external research sources.

31. The computer readable medium according to claim 24, wherein the market data is obtained from external market data sources.

32. The computer readable medium according to claim 24, wherein the steps of the method further comprise identifying changes in the coverage ratings data and updating the first software tool with the changes in the coverage ratings data.

33. The computer readable medium according to claim 24, wherein the steps of the method further comprise calculating EPS estimate changes and updating the first software tool with the EPS estimate changes.

* * * * *